(12) United States Patent
Tu et al.

(10) Patent No.: US 11,086,330 B2
(45) Date of Patent: Aug. 10, 2021

(54) AUTOMATIC GUIDED VEHICLE, AGV CONTROL SYSTEM, AND AGV CONTROL METHOD

(71) Applicant: Industrial Technology Research Institute, Hsinchu (TW)

(72) Inventors: Chao-Hui Tu, Taoyuan (TW); Ching-Tsung Cheng, New Taipei (TW); Yong-Ren Li, Taichung (TW); Ya-chi Chiu, Miaoli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 271 days.

(21) Appl. No.: 16/256,875

(22) Filed: Jan. 24, 2019

(65) Prior Publication Data

US 2020/0103916 A1 Apr. 2, 2020

(30) Foreign Application Priority Data

Sep. 28, 2018 (TW) .................................. 107134221

(51) Int. Cl.
*G05D 1/02* (2020.01)
*G01S 17/89* (2020.01)

(52) U.S. Cl.
CPC ......... *G05D 1/0234* (2013.01); *G05D 1/0212* (2013.01); *G05D 1/0214* (2013.01); *G01S 17/89* (2013.01); *G05D 2201/0216* (2013.01)

(58) Field of Classification Search
None
See application file for complete search history.

(56) References Cited

U.S. PATENT DOCUMENTS

| | | | |
|---|---|---|---|
| 5,051,906 A | * | 9/1991 | Evans, Jr. ................. G01S 5/16 701/28 |
| 5,367,458 A | | 11/1994 | Roberts et al. |

(Continued)

FOREIGN PATENT DOCUMENTS

| | | |
|---|---|---|
| CN | 103782247 A | 5/2014 |
| CN | 206312215 U | 5/2014 |

(Continued)

OTHER PUBLICATIONS

Taiwanese Office Action and Search Report for Taiwanese Application No. 107134221, dated Mar. 7, 2019.

(Continued)

*Primary Examiner* — Jonathan M Dager
*Assistant Examiner* — Garrett F Evans
(74) *Attorney, Agent, or Firm* — Birch, Stewart, Kolasch & Birch LLP

(57) ABSTRACT

A control system for an automatic guided vehicle includes a vehicle, a contour-detection module, a position-detection module, and a processing device. The contour-detection module is disposed on the vehicle. The contour-detection module is configured to detect a ceiling and a target object, which is disposed on the ceiling, and to generate a contour signal. The position-detection module is disposed on the vehicle. The position-detection module is configured to detect the position of the vehicle and generate a position signal. The processing device is configured to generate a target mark corresponding to the target object according to the contour signal and the position signal. The processing device is configured to automatically control the carrier to move along a movement path. When the contour-detection module detects the target object, the processing device corrects the movement direction of the vehicle according to the target mark.

12 Claims, 5 Drawing Sheets

(56) References Cited

U.S. PATENT DOCUMENTS

| | | | |
|---|---|---|---|
| 8,655,588 B2 | 2/2014 | Wong et al. | |
| 8,688,275 B1 | 4/2014 | LaFary et al. | |
| 9,632,504 B1* | 4/2017 | Watts | G05D 1/0231 |
| 2011/0010023 A1* | 1/2011 | Kunzig | G05D 1/0234 |
| | | | 701/2 |
| 2014/0235267 A1 | 8/2014 | Song et al. | |
| 2016/0309973 A1* | 10/2016 | Sheikh | A47L 11/4072 |
| 2018/0089616 A1* | 3/2018 | Jacobus | G06K 19/07758 |
| 2018/0215039 A1* | 8/2018 | Sinyavskiy | G05D 1/0274 |
| 2019/0168386 A1* | 6/2019 | Tang | B25J 11/0085 |
| 2019/0265721 A1 | 8/2019 | Troy et al. | |

FOREIGN PATENT DOCUMENTS

| | | |
|---|---|---|
| CN | 104102222 A | 10/2014 |
| CN | 102773862 B | 1/2015 |
| CN | 205229802 U | 5/2016 |
| CN | 106197404 A | 12/2016 |
| CN | 106846066 A | 6/2017 |
| CN | 107314766 A | 11/2017 |
| CN | 107450542 A | 12/2017 |
| CN | 108106604 A | 6/2018 |
| CN | 109506659 A | 3/2019 |
| CN | 107053219 B | 7/2019 |
| EP | 0339962 A2 | 4/1989 |
| TW | 201305761 A1 | 2/2013 |
| TW | 201323300 A1 | 6/2013 |
| TW | 201619022 A | 6/2016 |
| TW | 201739194 A | 11/2017 |
| TW | 201814413 A | 4/2018 |
| TW | 201825037 A | 7/2018 |
| WO | WO 95/29380 A1 | 11/1995 |
| WO | WO 2006/099317 A2 | 9/2006 |
| WO | WO 2018/194834 A1 | 10/2018 |

OTHER PUBLICATIONS

Taiwanese Office Action and Search Report, dated Sep. 1, 2020, for Taiwanese Application No. 108146646.

* cited by examiner

AUTOMATIC GUIDED VEHICLE, AGV CONTROL SYSTEM, AND AGV CONTROL METHOD

CROSS-REFERENCE TO RELATED APPLICATIONS

This Application claims the priority benefit of Taiwan Patent Application Serial No. 107134221, filed on Sep. 28, 2018. The entirety of the above-mentioned patent application is hereby incorporated by reference herein and made a part of this specification.

TECHNICAL FIELD

The disclosure relates to an automatic guided vehicle, a control system for the automatic guided vehicle, and a control method of the automatic guided vehicle.

BACKGROUND

With general distribution Centers and similar operations, in order to accelerate the transport of cargos and reduce labor costs, an automatic transport system may be built for storing cargos. In the conventional art, path marks are pasted on the floor, and an automated transport vehicle is configured to move along the path marks by detecting said path marks.

However, the number and the positioning of the cargos in the distribution center are not fixed, and thus it is necessary to modify the movement path of an automatic transport vehicle from time to time. In the conventional art, the path marks on the floor can be to be removed, and then new path marks can be pasted onto the floor. However, this leads to difficulties with establishing a new movement path for the automatic transport vehicle. In addition, since the path marks are pasted onto the floor, these path marks often break, making them hard to read and thereby causing the automatic transport vehicle to move incorrectly along the movement path.

Accordingly, although existing automatic transport systems have been generally adequate for their intended purposes, they have not been entirely satisfactory in all respects. Consequently, it would be desirable to provide a solution for improving the automatic transport system.

SUMMARY

The disclosure provides a control system for an automatic guided vehicle that includes a vehicle, a contour-detection module, a position-detection module, a drive wheel, a drive mechanism, a processing device, and a control device. The contour-detection module is disposed on the vehicle. The contour-detection module is configured to detect a ceiling and a target object disposed on the ceiling, and to generate a contour signal. The position-detection module is disposed on the vehicle. The position-detection module is configured to detect the position of the vehicle, and generate a position signal. The drive wheel is disposed on the vehicle. The drive mechanism is connected to the drive wheel, and drives the drive wheel to rotate.

The processing device is configured to generate a target mark corresponding to the target object according to the contour signal and the position signal, and electrically connected to the drive mechanism. The control device is placed on the vehicle, and configured to generate a control signal. The processing device is configured to control the drive mechanism to rotate the drive wheel according to the control signal. The processing device is configured to automatically control the drive mechanism to move the vehicle in a movement path. When the target object is detected by the contour-detection module, the processing device corrects the movement direction of the vehicle according to the target mark.

The disclosure provides an automatic guided vehicle including a vehicle, a contour-detection module, a position-detection module, a processing device and a control device. The vehicle includes a loading platform and a support frame disposed on the front side of the loading platform. The contour-detection module is disposed on the support frame, and configured to detect a ceiling and a target object disposed on the ceiling. The position-detection module is disposed on the vehicle, and configured to detect the position of the vehicle. The processing device is electrically connected to the contour-detection module and the position-detection module. The control device is placed on the support frame, and configured to control the movement of the vehicle.

The disclosure provides a control method of an automatic guided vehicle including detecting a ceiling and a target object disposed on the ceiling, and using a contour-detection module to generate a contour signal; and using a position-detection module to detect the position of a vehicle, and generating a position signal. The control method of the automatic guided vehicle further includes using a processing device to generate a target mark that corresponds to the target object according to the contour signal and the position signal; and driving the vehicle to move automatically along a movement path. When the contour-detection module detects the target object, the movement direction of the vehicle is corrected according to the target mark.

BRIEF DESCRIPTION OF THE DRAWINGS

The invention can be more fully understood by reading the subsequent detailed description and examples with references made to the accompanying drawings, wherein.

DETAILED DESCRIPTION OF THE DISCLOSURE

The following disclosure provides many different embodiments, or examples, for implementing different features of the disclosure. Specific examples of components and arrangements are described below to simplify the disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures.

The disclosure provides an automatic guided vehicle, a control system for the automatic guided vehicle, and a control method of the automatic guided vehicle. The movement direction of the automatic guided vehicle is corrected according to the existing target object disposed on the ceiling, thereby reducing the difficulty and cost of constructing or modifying the movement path of the automatic guided vehicle.

Figure 1:
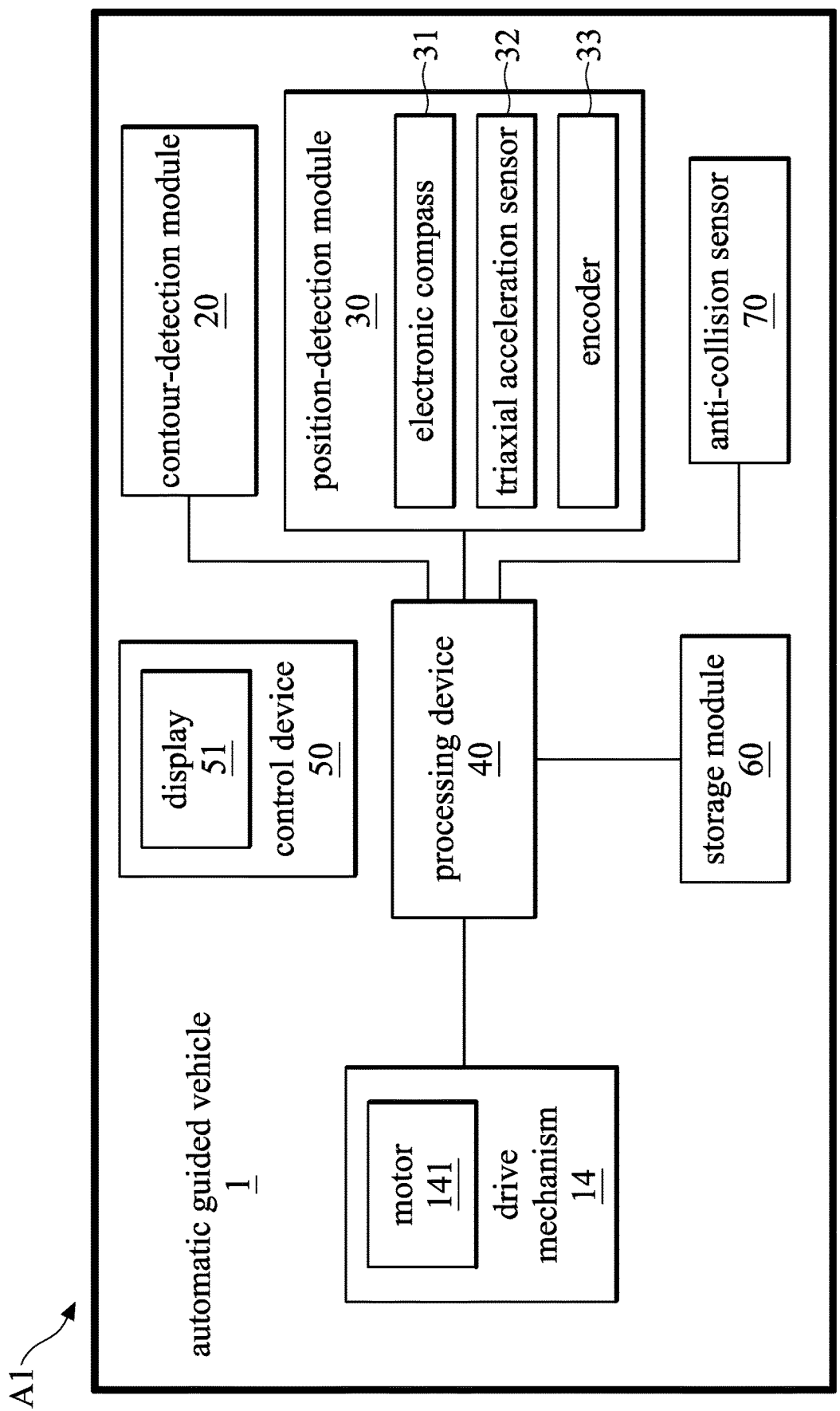
FIG. 1 is a system diagram of the control system for the automatic guided vehicle in accordance with some embodiments of the disclosure.
Figure 2:
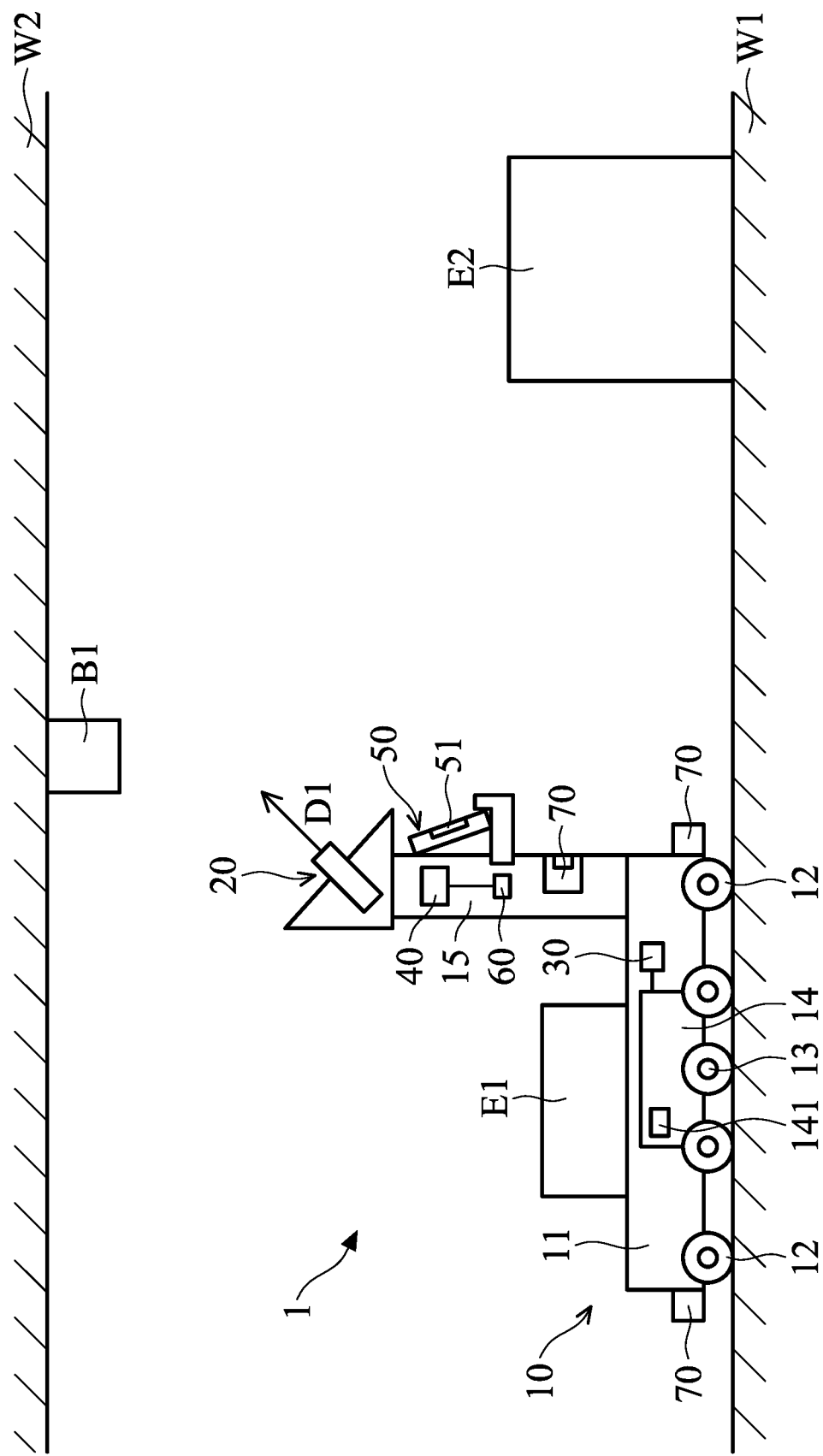
FIG. 2 is a schematic view of the automatic guided vehicle in accordance with some embodiments of the disclosure.

FIG. 1 is a system diagram of the control system A1 for the automatic guided vehicle 1 in accordance with some embodiments of the disclosure. FIG. 2 is a schematic view of the automatic guided vehicle 1 in accordance with some embodiments of the disclosure. As shown in FIG. 1 and FIG. 2, the control system A1 includes an automatic guided vehicle (AGV) 1. The automatic guided vehicle 1 may be placed on the floor W1 of a warehouse, and move along the floor W1.

Figure 3:
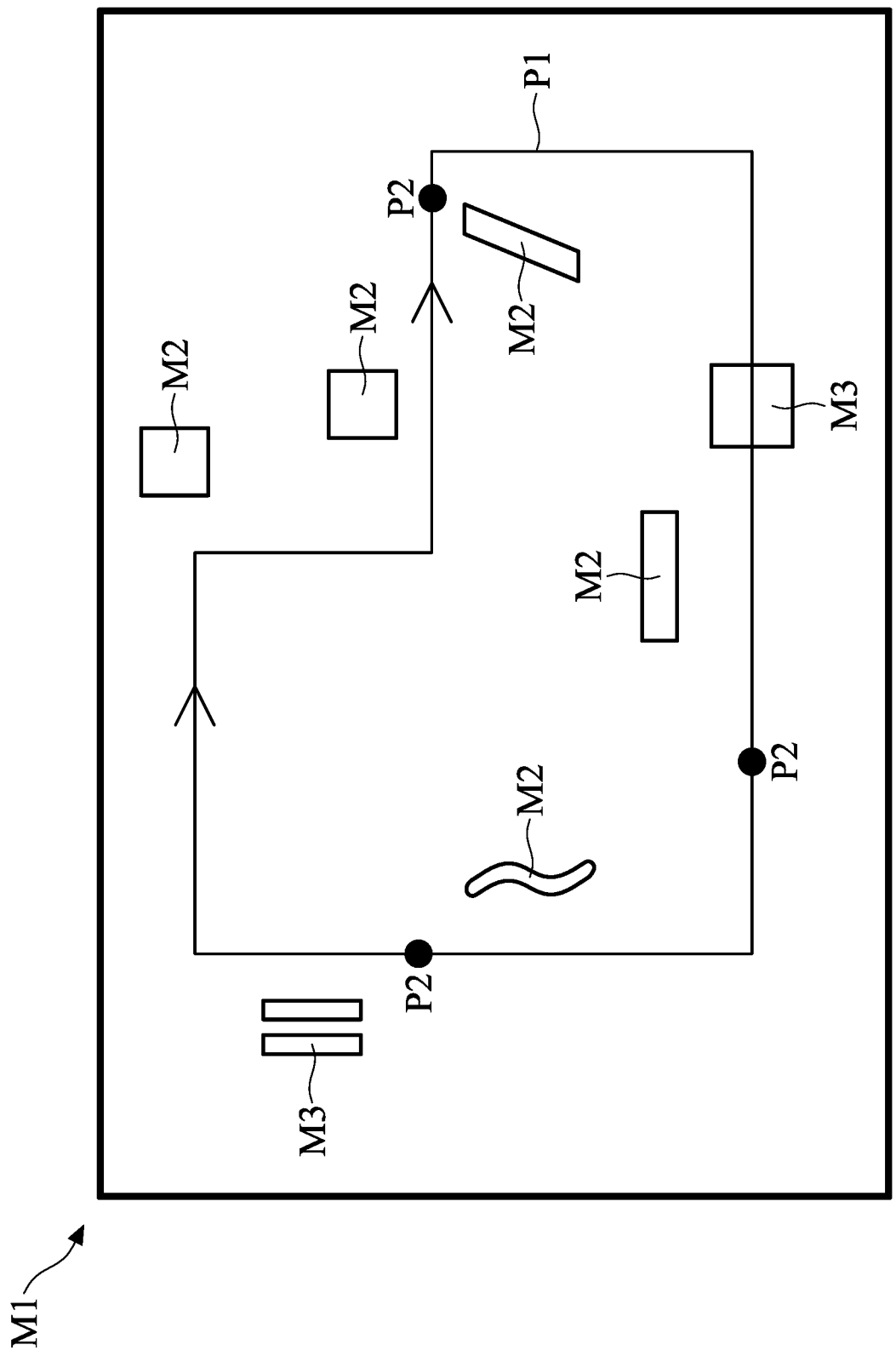
FIG. 3 is the contour map and the target marks in accordance with some embodiments of the disclosure.

In this embodiment, the automatic guided vehicle 1 is configured to carry one or more cargos E1. Moreover, the automatic guided vehicle 1 may move along a movement path P1 (as shown in FIG. 3), and the movement direction of the automatic guided vehicle 1 may be corrected according to target objects B1 that are disposed on the ceiling W2. The floor W1 and the ceiling W2 may substantially extend parallel to the horizontal plane. In other words, the floor W1 may be substantially parallel to the ceiling W2, and separated from the ceiling W2. Moreover, the automatic guided vehicle 1 is located between the floor W1 and the ceiling W2. The target objects B1 protrude from the ceiling W2.

In this embodiment, the height of the target object B1 relative to of the ceiling W2 may be greater than or equal to 5 cm. The shapes and sizes of the target objects B1 may not to be limited. The target objects B1 may be the objects, such as lamps that had been disposed on the ceiling W2, or the protruded objects that are manually disposed on the ceiling W2.

The automatic guided vehicle 1 includes a vehicle 10, a contour-detection module 20, a position-detection module 30, a processing device 40, and a control device 50. The vehicle 10 is configured to carry and transport one or more cargos E1. The vehicle 10 includes a loading platform 11, loading wheels 12, drive wheels 13, a drive mechanism 14, and a support frame 15.

The loading platform 11 is configured to carry the cargo E1. The loading wheels 12 and the drive wheels 13 are rotatably coupled with the loading platform 11. When the vehicle 10 is placed on the floor W1, the loading wheels 12 and the drive wheels 13 are in contact with the floor W1. The drive mechanism 14 is disposed on the loading platform 11. In some embodiments, the drive mechanism 14 is located in the loading platform 11. The drive mechanism 14 is connected to the drive wheels 13, and drives the drive wheels 13 to rotate or turn in different directions. Therefore, the vehicle 10 can be moved relative to the floor W1 by the drive mechanism 14 to drive the drive wheel 13 to rotate. In some embodiments, the drive mechanism 14 includes a motor 141.

The motor 141 is coupled with the drive wheel 13, and drives the drive wheel 13 to rotate or turn in different directions.

The support frame 15 is disposed on the front side of the loading platform 11. In this embodiment, the support frame 15 may be a columnar structure that is substantially perpendicular to the loading platform 11.

The contour-detection module 20 is disposed on the vehicle 10. In this embodiment, the contour-detection module 20 is disposed on the top of the support frame 15. The contour-detection module 20 is configured to detect the contour of the ceiling W2 and the target object B1 adjacent to the contour-detection module 20, and generate contour signals according to the result of the detection.

The contour-detection module 20 may be a depth camera or a laser rangefinder. In this embodiment, contour-detection module 20 may be a depth camera. The contour-detection module 20 is configured to capture images of the ceiling W2 and the target object B1 adjacent to the contour-detection module 20. Therefore, the contour signals may be image signals.

In some embodiments, the contour-detection module 20 may be a laser rangefinder that is configured to measure the distance between the ceiling W2 (or the target object B1) and the contour-detection module 20 in a measuring direction Dl.

The position-detection module 30 is disposed on the vehicle 10. In this embodiment, the position-detection module 30 is disposed in the loading platform 11. The position-detection module 30 is configured to detect the position of the vehicle 10, and generate position signals. The position signal may include coordinates, and the coordinates may include an X-coordinate and a Y-coordinate.

In some embodiments, the position-detection module 30 includes an electronic compass 31, a triaxial acceleration sensor 32, and a motor encoder 33. The electronic compass 31 is configured to detect the direction of the vehicle 10. The triaxial acceleration sensor 32 is configured to detect the acceleration of vehicle 10 in the directions of three axes. The motor encoder 33 is configured to detect the number of rotations of the motor 141, so as to estimate the moving distance of the vehicle 10. With the detection results of the electronic compass 31, the triaxial acceleration sensor 32, and the motor encoder 33, the processing device 40 may calculate the coordinates of the vehicle 10 according to the position signal.

The processing device 40 is disposed on the vehicle 10. In this embodiment, the processing device 40 may be a computer, such as a tablet computer. The computer may include microprocessor and memory, etc. The microprocessor can process signals generated by components, such as the drive mechanism 14, the contour-detection module 20, and the position-detection module 30. The computer may be disposed on the support frame 15. The processing device 40 is electrically connected to the drive mechanism 14, the contour-detection module 20 and the position-detection module 30. The processing device 40 may be control the drive mechanism 14 to make the drive wheel 13 to rotate or turn in different directions.

The control device 50 may be placed on the support frame 15, and configured to control the movement of the vehicle 10. The control device 50 is located at the front side of the support frame 15 in order to facilitate the user to take the control device 50 from the vehicle 10. Moreover, the user can conveniently operate the control device 50 and view the information displayed by the control device 50. In this embodiment, the height of the contour-detection module 20 relative to the loading platform 11 is greater than the height of the control device 50 relative to the loading platform 11.

In this embodiment, the control device 50 may be a computer. In some embodiments, the control device 50 may be a tablet computer. The control device 50 may be coupled with the processing device 40 by wireless or wired transmission. The user may take the control device 50 from the support frame 15. Afterwards, the user can manually control the control device 50 and control the movement of the vehicle 10 by operating the control device 50.

The control device 50 further includes a display 51. The display 51 may be a liquid-crystal display. In this embodiment, the display 51 may be a touch display. When the user operates the control device 50 or the display 51, the control device 50 generates control signals. The processing device 40 receives the control signals, and controls the drive mechanism 14 to rotate or turn the drive wheel 13 according to the control signals, thereby moving the vehicle 10.

FIG. 3 is the contour map M1 and the target marks M2 in accordance with some embodiments of the disclosure. In this embodiment, when the control device 50 controls the vehicle 10 to move, the contour-detection module 20 may continuously detect the ceiling W2 and the target objects B1 and continuously generate contour signals to the processing device 40. Moreover, the position-detection module 30 may continuously detect the position of the vehicle 10 and continuously generate position signals to the processing device 40.

The processing device 40 may receive the contour signals generated by the contour-detection module 20, and receive the position signals generated by the position-detection module 30. The processing device 40 may generate a contour map M1 corresponding to the ceiling W2 and the target objects B1 according to the contour signals and the position signals. In some embodiments, the contour map M1 may be a three-dimensional contour map. In addition, the processing device 40 may generate target marks M2 corresponding to the contour and the position of the target objects B1 according to the contour signal and the position signal.

In this embodiment, the processing device 40 can transmit the contour map M1 and the target marks M2 to the control device 50 via wireless transmission. The control device 50 can receive the contour map M1 and the target marks M2 via wireless transmission and display them on the display 51. Moreover, the processing device 40 stores the contour map M1 and the target marks M2 in a storage module 60. In some embodiments, the storage module 60 is electrically connected to the processing device 40. The storage module 60 may be a memory.

In this embodiment, the contour map M1 includes coordinates and depth values. The coordinates are generated according to the position signals detected by the position-detection module 30. The depth values may be generated according to the contour signals detected by the contour-detection module 20. Moreover, the processing device 40 may generate coordinates corresponding to each depth value according to the contour signals and the position signals.

In some embodiments, the depth values in areas of the ceiling W2 that the target object B1 is not disposed thereon may be zero. The depth values corresponding to the target objects B1 may be the height of the target objects B1 relative to the ceiling W2. For example, the depth values corresponding to the target objects B1 may be 5 cm.

Since the target objects B1 protrudes from the ceiling W2 in this embodiment, the processing device 40 may determine one depth value that corresponds to one target object B1 when the depth value is greater than or equal to a predetermined value. The processing device 40 may draw a target mark M2 corresponding to the contour of the target object B1 according to the depth value (that is greater than the predetermined value) and the coordinates corresponding to the depth value. Moreover, the processing device 40 or the control device 50 can map the target mark M2 to the contour map M1. In other words, the target mark M2 includes coordinates corresponding to the position of the target object B1, and at least one depth value corresponding to the height of the target object B1 relative to the ceiling W2.

As shown in FIG. 3, many target marks M2 are marked on the contour map M1, and each target mark M2 correspond to the position, shape and/or contour of each target object B1. The target marks M2 may have different shapes in FIG. 3. The target marks M2 with different shapes may make the processing device 40 more accurately determine the target objects B1 that corresponding to the target marks M2 captured by the contour-detection module 20. Moreover, in FIG. 3, the contour map M1 marks a position of the vehicle M3 that corresponds to the position of the vehicle 10. The position of the vehicle M3 may be generated according to the position signal of the position-detection module 30.

After the contour map M1 and the target mark M2 are obtained, the user can operate the control device 50 to set a movement path P1 on the contour map M1. The user can operate the control device 50 to make the processing device 40 automatically control the vehicle 10 to move along the movement path P1.

The user can further operate the control device 50 to set stop points P2 on the movement path P1. When the processing device 40 determines that the vehicle 10 is at one of the stop points P2 according to the position signals, the processing device 40 may control the drive mechanism 14 to stop the vehicle 10 from moving. Moreover, the user may operate the control device 50 to move the vehicle 10 from the stop point P2 along the movement path P1 again.

In this embodiment, the automatic guided vehicle 1 further includes anti-collision sensors 70. The anti-collision sensors 70 may be disposed on the front side and the rear side of the vehicle 10, and electrically connected to the processing device 40. When the anti-collision sensors 70 detect a barrier object E2, the anti-collision sensors 70 generate a warning signal to the processing device 40. The processing device 40 may stop the vehicle 10 from moving according to the warning signal. The anti-collision sensors 70 may prevent the damage of the vehicle 10 from colliding to the barrier object E2 when the barrier object E2 is in the movement path P1.

In this embodiment, the anti-collision sensors 70 may be ultrasonic sensors and/or infrared sensors. The anti-collision sensor 70 are disposed on the front side of the loading platform 11, the rear side of the loading platform 11 and/or the front side of the support frame 15.

Figure 4:
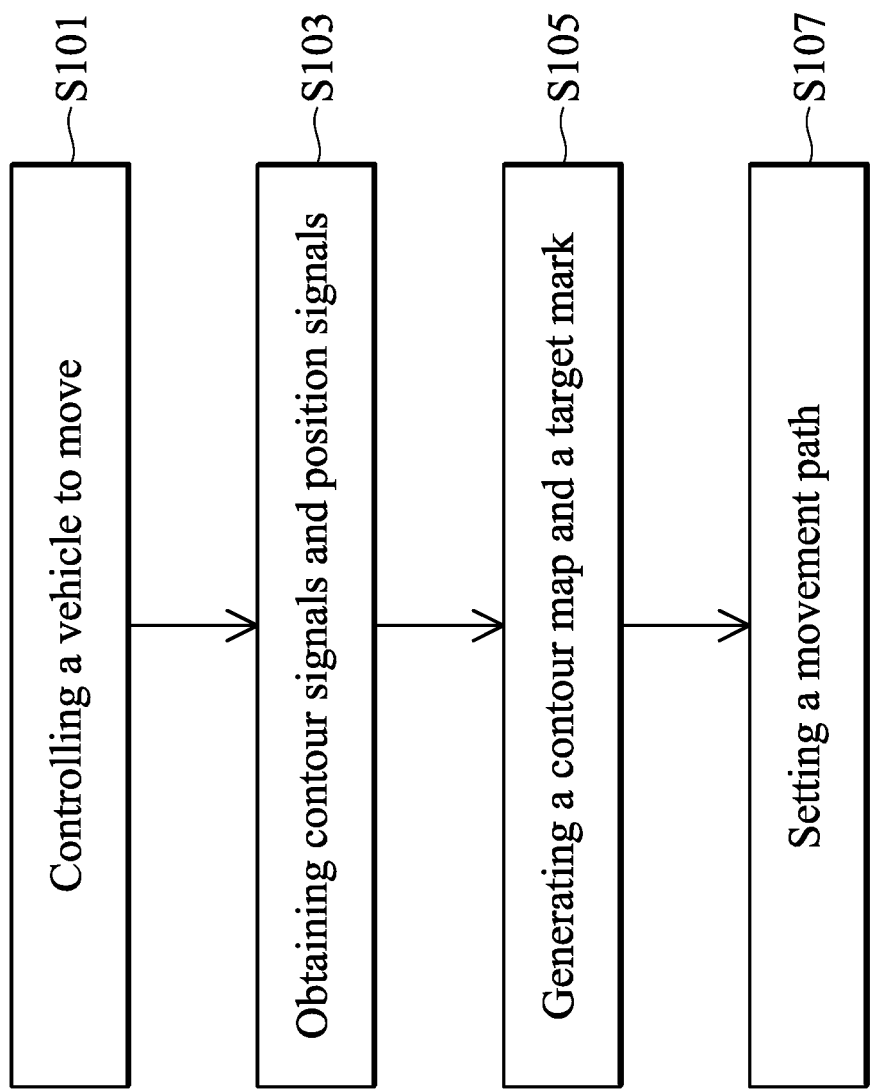
FIG. 4 is a flow chart of the control method of an automatic guided vehicle in the stage of drawing the contour map, in accordance with some embodiments of the disclosure.

FIG. 4 is a flow chart of the control method of an automatic guided vehicle 1 in the stage of drawing the contour map M1, in accordance with some embodiments of the disclosure. When the vehicle 10 is moving, the vehicle 10 may deviate from the movement path P1 due to collision or pushing by human or mechanical errors. In the embodiment, the direction of movement of the automatic guided vehicle 1 can be corrected by the control method of the automatic guided vehicle 1 of the disclosure.

Additional operations can be provided before, during, and after the method, and some of the operations described can be replaced or eliminated for other embodiments of the method.

In step S101, the control device 50 can control the vehicle 10 to move. In step S103, when the vehicle 10 is moving, the contour-detection module 20 continuously detects the ceiling W2 and the target object B1, and continuously generates contour signals. Moreover, the position-detection module 30 continuously detects the position of the vehicle 10, and continuously generates position signals.

In step S105, the processing device 40 generates the contour map M1 and the target marks M2 according to the contour signals and the position signals. The contour map M1 corresponds to the contour of the ceiling W2 and the target objects B1, and the target marks M2 correspond to the contour of the target objects B1.

In this embodiment, the target objects B1 of the disclosure may be any objects that protrude from the ceiling W2. In addition, the shapes of the target objects B1 are not limited. Therefore, the target object B1 may be objects, such as lamps, that had been disposed on the ceiling W2. Additional target objects B1 may not be needed to be installed, which simplifies the construction and cost of the control system A1 for the automatic guided vehicle 1.

Moreover, many cargos E1 may be accumulated on the floor W1 of the warehouse, and the cargos E1 may be placed on any position on the floor W1. Therefore, due to the target objects B1 disposing on the ceiling W2, the target objects B1 are prevented from being covered by the cargos E1 or being damaged due to collision.

In step S107, the processing device 40 displays the contour map M1 and the target marks M2 on the display 51 of the control device 50. Therefore, the user can easily use the control device 50 to set the movement path P1 and the stop points P2 according to the contour map M1 and the target marks M2.

Figure 5:
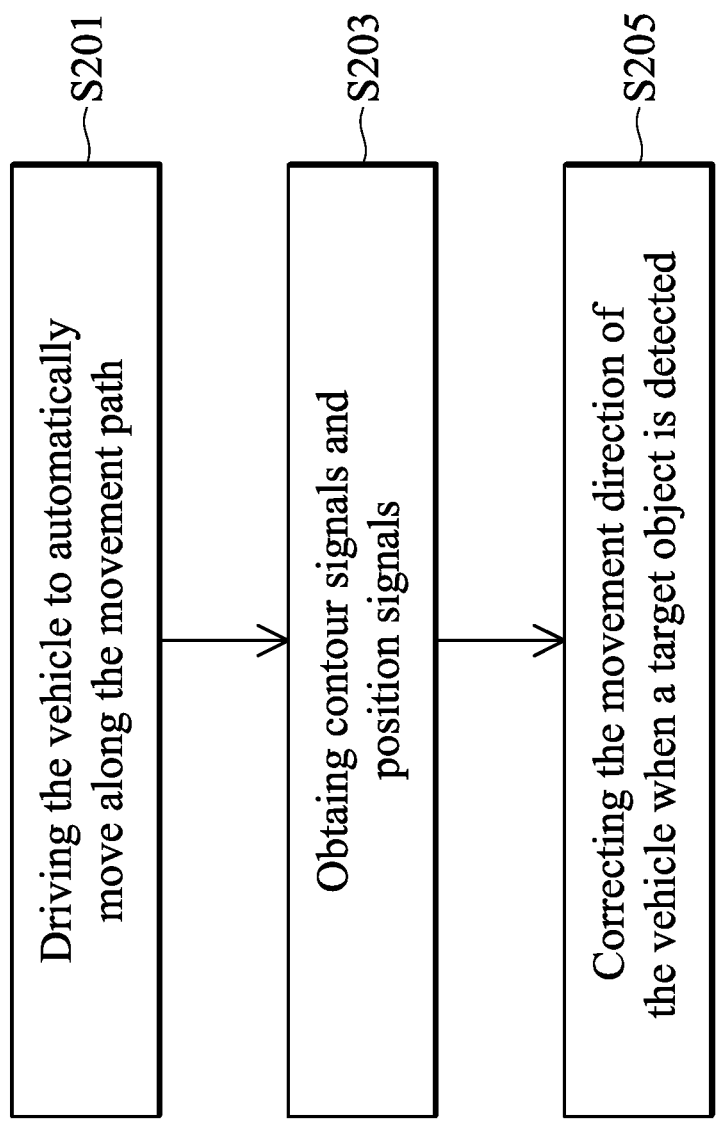
FIG. 5 is a flow chart of the control method of the automatic guided vehicle in the automatic movement stage, in accordance with some embodiments of the disclosure.

FIG. 5 is a flow chart of the control method of the automatic guided vehicle 1 in the automatic movement stage in accordance with some embodiments of the disclosure. In step S201, the automatic guided vehicle 1 can be placed on the movement path P1. The automatic-moving function of the automatic guided vehicle 1 can be started by the control device 50, so that the processing device 40 can control the vehicle 10 to automatically move along the movement path P1.

In some embodiments, the automatic guided vehicle 1 does not need to be placed on the movement path P1. After the control device 50 starts the automatic-moving function of the automatic guided vehicle 1, the automatic guided vehicle 1 can automatically move to the movement path P1.

In step S203, when the vehicle 10 is moving, the contour-detection module 20 continuously detects the ceiling W2 and the target objects B1, and continuously generates the contour signals. Moreover, the position-detection module 30 continuously detects the position of the vehicle 10 and continuously generates the position signals.

In step S205, when the target object B1 is detected by the contour-detection module 20, the movement direction of the vehicle 10 is corrected according to the target mark M2. In this step, the processing device 40 analyzes the contour signals to obtain depth values corresponding to the contour signals. When at least one depth value is greater than a predetermined value, the processing device 40 determines that the contour-detection module 20 detects the target object B1.

In this embodiment, the processing device 40 may obtain coordinates corresponding to at least one depth value that is greater than the predetermined value according to the position signals, thereby obtaining a detection contour. The processing device 40 searches for the target mark M2 corresponding to the detection contour according to the detection contour and the position signals. The processing device 40 calculates the deviation of the distance between the target mark M2 and the detection contour, and further calculates the deviation between the vehicle 10 and the movement path P1.

Afterwards, the processing device 40 corrects the movement direction of the vehicle 10 to move the vehicle 10 to the movement path P1 according to the deviation between the vehicle 10 and the movement path P1.

In this embodiment, when the automatic guided vehicle 1 often deviates from the movement path P1 in a specific section of the movement path P1, an additional target object B1 can be installed on the ceiling W2 near the specific section. Since the target object B1 does not define a specific material, shape, and size, it can be recognized by the contour-detection module 20 as long as the target object B1 is higher than the predetermined height relative to the ceiling W2. Therefore, the user may select target objects B1 with lower cost, thereby reducing the cost of building the target objects B1.

In conclusion, the control system for the automatic guided vehicle of the disclosure may utilize existing objects on the ceiling as the target objects, thereby reducing the cost of building a movement path for the automatic guided vehicle. When modifying the movement path, it may not be necessary to rebuild the target object, thereby reducing the cost of modifying the movement path. Moreover, the target objects of the disclosure are disposed on the ceiling to prevent damage, which can occur when a target object is disposed on the floor.

While the invention has been described by way of example and in terms of embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control system for an automatic guided vehicle, comprising:
   a vehicle;
   a contour-detection module disposed on the vehicle, wherein the contour-detection module is configured to detect a ceiling and a target object disposed on the ceiling, and generate a contour signal;
   a position-detection module disposed on the vehicle, wherein the position-detection module is configured to detect a position of the vehicle, and generate a position signal;
   a drive wheel disposed on the vehicle;
   a drive mechanism disposed on and connected to the drive wheel, and configured to drive the drive wheel to rotate; and
   a processing device configured to generate a target mark corresponding to the target object according to the contour signal and the position signal, and electrically connected to the drive mechanism;
   a control device placed on the vehicle, and configured to generate a control signal;
   wherein the processing device is configured to control the drive mechanism to rotate the drive wheel according to the control signal,
   wherein the processing device is configured to automatically control the drive mechanism to move the vehicle in a movement path, and when the target object is detected by the contour-detection module, the processing device corrects the movement direction of the vehicle according to the target mark;

wherein the target mark comprises coordinates corresponding to a position of the target object and a depth value corresponding to the coordinates and a height of the target object relative to the ceiling;

wherein the processing device generates a contour map that corresponds to the ceiling and the target object according to the contour signal and the position signal;

when the depth value is greater than or equal to a predetermined value, the processing device determines the depth value that corresponds to the target object, and the target mark that corresponds to a contour of the target object is drew to the contour map by the processing device according to the depth value and the coordinates.

2. The control system for an automatic guided vehicle as claimed in claim 1, wherein the contour-detection module is a depth camera or a laser rangefinder, and the position-detection module comprises an electronic compass, a triaxial acceleration sensor, and a motor encoder.

3. An automatic guided vehicle, comprising:
a vehicle, comprising a loading platform and a support frame disposed on a front side of the loading platform;
a contour-detection module disposed on the support frame, and configured to detect a ceiling and a target object disposed on the ceiling;
a position-detection module disposed on the vehicle, and configured to detect a position of the vehicle;
a processing device electrically connected to the contour-detection module and the position-detection module; and
a control device placed on the support frame, and configured to control the movement of the vehicle;
wherein the control device further comprises a display, configured to display a contour map and the position of the vehicle on the contour map;
when a depth value detected by the contour-detection module is greater than or equal to a predetermined value, the processing device determines the depth value that corresponds to the target object, and a target mark that corresponds to a contour of the target object is drew to the contour map by the processing device according to the depth value and the position of the vehicle.

4. The automatic guided vehicle as claimed in claim 3, wherein the vehicle further comprising:
a drive mechanism disposed on the loading platform, and electrically connected to the processing device; and
a drive wheel connected to the drive mechanism;
wherein the drive mechanism is configured to drive the drive wheel to rotate.

5. The automatic guided vehicle as claimed in claim 3, further comprising an anti-collision sensor, disposed on the front side of the vehicle, and electrically connected to the processing device;

wherein when the anti-collision sensor detects a barrier object, the anti-collision sensor transmits a warning signal to the processing device.

6. The automatic guided vehicle as claimed in claim 5, wherein the anti-collision sensor is disposed on a front side of the loading platform and a front side of the support frame, and the anti-collision sensor is an ultrasonic sensor or an infrared sensor.

7. The automatic guided vehicle as claimed in claim 3, wherein the display is a touch display.

8. The automatic guided vehicle as claimed in claim 3, wherein a height of the contour-detection module relative to the loading platform is greater than a height of the control device relative to the loading platform.

9. The automatic guided vehicle as claimed in claim 3, wherein the control device is located at the front side of the support frame.

10. The automatic guided vehicle as claimed in claim 3, wherein the support frame is substantially a columnar structure, and substantially extends perpendicular to the loading platform.

11. A control method of an automatic guided vehicle, comprising:
using a contour-detection module to detect a ceiling and a target object disposed on the ceiling, and generating a contour signal;
using a position-detection module to detect a position of a vehicle and to generate a position signal;
using a processing device to generate a target mark that corresponds to the target object according to the contour signal and the position signal;
driving the vehicle to move automatically along a movement path;
correcting the movement direction of the vehicle according to the target mark when the contour-detection module detects the target object;
using the processing device to generate a contour map that corresponds to the ceiling and the target object according to the contour signal and the position signal; and
setting the movement path according to the contour map and the target mark;
when a depth value detected by the contour-detection module is greater than or equal to a predetermined value, the processing device determines the depth value that corresponds to the target object, and the target mark that corresponds to a contour of the target object is drew to the contour map by the processing device according to the depth value and the position of the vehicle.

12. The control method of an automatic guided vehicle as claimed in claim 11, further comprising using a control device to control the movement of the vehicle.

* * * * *